United States Patent [19]

Ledley

[11] Patent Number: 4,651,200
[45] Date of Patent: Mar. 17, 1987

[54] SPLIT-IMAGE, MULTI-POWER MICROSCOPIC IMAGE DISPLAY SYSTEM AND METHOD

[75] Inventor: Robert S. Ledley, Silver Spring, Md.

[73] Assignee: National Biomedical Research Foundation, Washington, D.C.

[21] Appl. No.: 784,615

[22] Filed: Oct. 4, 1985

Related U.S. Application Data

[63] Continuation-in-part of Ser. No. 697,930, Feb. 4, 1985.

[51] Int. Cl.$^4$ .......................................... H04N 7/18
[52] U.S. Cl. ...................................... 358/93; 350/505; 350/520; 358/225
[58] Field of Search ............... 358/93, 101, 225, 227, 358/107; 350/504, 505, 519, 520

[56] References Cited

U.S. PATENT DOCUMENTS

| | | | |
|---|---|---|---|
| 2,527,719 | 10/1950 | Greenstein et al. | 350/558 |
| 2,685,820 | 8/1954 | Kaprelian | 350/505 |
| 2,699,092 | 1/1955 | Rantsch | 350/509 |
| 2,950,649 | 8/1960 | Horn | 350/509 |
| 3,030,861 | 4/1962 | Mortimer et al. | 350/414 |
| 3,057,259 | 10/1962 | Schuma | 350/414 |
| 3,353,891 | 11/1967 | Rosenberger | 350/519 |
| 3,459,464 | 8/1969 | Smith | 350/511 |
| 3,488,104 | 1/1970 | Doherty | 350/511 |
| 3,503,684 | 3/1970 | Preston, Jr. et al. | 356/39 |
| 3,525,803 | 8/1970 | Smart | 358/93 |
| 3,835,246 | 9/1974 | Muller | 358/93 |
| 3,871,741 | 3/1975 | Clave et al. | 350/511 |
| 3,883,689 | 5/1975 | Mansour | 358/93 |
| 3,895,854 | 7/1975 | Ziffer | 350/511 |
| 4,199,785 | 4/1980 | McCullough | 358/180 |
| 4,218,112 | 8/1980 | Ruker | 350/511 |
| 4,245,252 | 1/1981 | Nagumo | 358/183 |
| 4,440,475 | 4/1984 | Colliaux | 350/502 |
| 4,546,771 | 10/1985 | Eggleton et al. | 128/660 |

Primary Examiner—Howard W. Britton
Attorney, Agent, or Firm—Joseph G. Seeber

[57] ABSTRACT

A split-image, multi-power microscopic image display system and method wherein the image of an object positioned on a slide is split into two optical paths, and is magnified to a varying degree in each optical path, the resulting respectively magnified images being displayed on respective monitor devices. The initial optical path includes an objective and a splitter; the paths of lower magnification and higher magnification each include a TV camera and a TV monitor, and may include various optical elements in accordance with the four disclosed embodiments. Further features of the invention include the following: provision of a microcomputer with data entry means, and respective mixers disposed between the TV cameras and their monitors for insertion of identifying information into the video signal, with subsequent display on the monitors of the identifying information and the image of the object being microscopically viewed; provision of a photographic printer for producing a hardcopy record of the image viewed; and provision of a lens switching arrangement for selection of various objectives without the necessity of refocusing after a lens is switched into position.

49 Claims, 12 Drawing Figures

SPLIT-IMAGE, MULTI-POWER MICROSCOPIC IMAGE DISPLAY SYSTEM AND METHOD

REFERENCE TO RELATED APPLICATION

This is a continuation-in-part (CIP) of U.S. Ser. No. 697,930 filed on Feb. 4, 1985.

TECHNICAL FIELD

The present invention relates to a split-image, multi-power microscopic image display system for use in viewing simultaneously two images of the same object or specimen, each image having a different magnification with respect to the other.

BACKGROUND ART

In certain microscopic viewing applications, such as microscopic examination of chromosomes, it is necessary for the technician to view a relatively large area of the specimen under a lower magnification power in order to locate a particular smaller area to be viewed, and then to switch magnifications and refocus in order to view the smaller area of concern under a larger magnification. Much time is wasted performing these manipulations, and it is quite inefficient and inconvenient for the technican to have to refocus the microscope after switching to a higher magnification.

Accordingly, it would be considered highly desirable to provide a split-image microscopic image display system and method having multiple magnification powers, and it would especially be desirable to provide such a system with the capability of simultaneously viewing and displaying on two monitors both the larger area of general interest and the smaller area of specific interest. Moreover, it would also be considered desirable to provide such a system with the capability of producing, on operator command, a hardcopy of the images displayed on either of the monitors (the high-power monitor or the low-power monitor).

In some applications, it might be desirable to provide such a split-image, multi-power microscopic image display system and method with a type of lens switching apparatus whereby lenses of varying physical characteristics can be manually and yet easily employed as the objective lens in the microscopic image display system and method. However, as mentioned previously, the technology of the prior art is such as to require a refocusing of the microscope each time a new lens is switched into place for use as the objective. Therefore, it is considered desirable to provide a lens switching arrangement wherein refocusing is not required each time a new lens is switched into position.

The following patents are generally pertinent to the present invention: U.S. Pat. Nos. 2,527,719; 2,699,092; 2,950,649; 3,030,861; 3,057,259; 3,353,891; 3,459,464; 3,488,104; 3,503,684; 3,871,741; 3,895,854; 4,218,112; and 4,440,475.

DISCLOSURE OF INVENTION

The present invention relates to a split-image, multi-power microscopic image display system and method.

Specifically, the present invention relates to a microscopic image display system and method wherein the optical image of a specimen is, as a result of the employment of a splitter, directed along two optical paths. In each embodiment of the invention, a first optical path includes a trinocular microscope head for operator viewing of the specimen during initial microscopic setup, in combination with a first TV camera to which the image is presented as an optical input and a first TV monitor connected to the first camera for producing a visual image of the specimen magnified in accordance with a first magnification power. The second optical path of each embodiment includes a bending prism for presenting to a second TV camera, as an optical input thereto, an image of the specimen magnified in accordance with a second magnification power, and a second TV monitor connected to the second TV camera for presenting a visual image thereof.

In a first embodiment of the invention, a relatively high power objective lens is employed to achieve a magnified image of the specimen in accordance with a higher magnification power, and a combination of lenses in the second optical path demagnifies the magnified image to provide an image of the specimen magnified in accordance with a lower magnification power.

In a second embodiment of the invention, a relatively low power objective or lithography lens is employed to achieve a magnified image of the specimen in accordance with a lower magnification power, and a magnification lens is provided in the first optical path to magnify the already magnified image so as to provide an image of the specimen magnified in accordance with a higher magnification power.

In a third embodiment of the invention, a relatively low power objective or lithography lens is employed to achieve a magnified image of the specimen in accordance with the lower magnification power, and one of the TV cameras is operated in such a way as to underscan the magnified image of the specimen so as to achieve display, on the associated TV monitor, of a further magnified view of the magnified image of the specimen, thus effectively providing an image of the specimen magnified in accordance with the higher magnification power mentioned above.

In a fourth embodiment of the invention, a relatively low power objective or lithography lens is employed to achieve a magnified image of the specimen in accordance with the lower magnification power, a magnifying lens is employed in a first optical path so as to further magnify the image of the specimen, achieving magnification in accordance with a somewhat higher magnification power, and a further magnifying lens (or Barlow lens) is employed in a second optical path so as to achieve further magnification of the image of the specimen, resulting in magnification of the specimen in accordance with an even higher magnification power.

Preferably, the microscopic image display system and method of the present invention includes a microcomputer having an operator input means (such as a keyboard) for inputting information pertaining to the specimen being viewed, in combination with a mixer connected between the microcomputer and the TV camera(s), on the one hand, and the TV monitor(s), on the other hand, for displaying on the TV screen, as an inset, the information pertinent to the particular specimen being viewed. As a further preference, the microscopic image display system and method includes a slave monitor or monitors, each slave monitor being connected to an output of a respective one of the TV monitors, the system and method further including one or more respective photographic printers, each photographic printer being connected to a respective one of the slave monitors for producing a hardcopy record of the image being displayed at a particular time.

In accordance with a further feature of the invention, the microscopic image display system and method is provided with an objective lens switching apparatus by means of which the operator can switchably employ two or more lenses of varying characteristics as the objective lens of the microscopic image display system and method. However, in accordance with this feature of the present invention, each time the operator switches the lens into position, it is not necessary for the operator to refocus the microscope.

Therefore, it is a primary object of the present invention to provide a split-image, multi-power microscopic image display system and method.

It is an additional object of the present invention to provide a microscopic image display system and method having at least two optical paths, each optical path providing a visual image of a specimen magnified in accordance with a respective magnification power.

It is an additional object of the present invention to provide a microscopic image display system and method employing at least two TV cameras and at least two respectively associated TV monitors for viewing the respective magnified images of the specimen.

It is an additional object of the present invention to provide a microscopic image display system and method having the capability of producing a hardcopy record of the specimen being viewed.

It is an additional object of the present invention to provide a microscopic image display system and method wherein information relevant to the particular specimen being viewed can be electronically inserted into the TV signals so that it can be viewed simultaneously with the magnified image of the specimen.

It is an additional object of the present invention to provide a microscopic image display system and method having a lens switching apparatus for providing the operator with the capability of switching various lenses into place without the need for refocusing after each lens switching operation.

The manner in which these and other objects are accomplished by the present invention will become clear from the following detailed description of a preferred embodiment.

BEST MODE FOR CARRYING OUT THE INVENTION

The invention will now be described in more detail with reference to the figures of the drawings.

Figure 1:
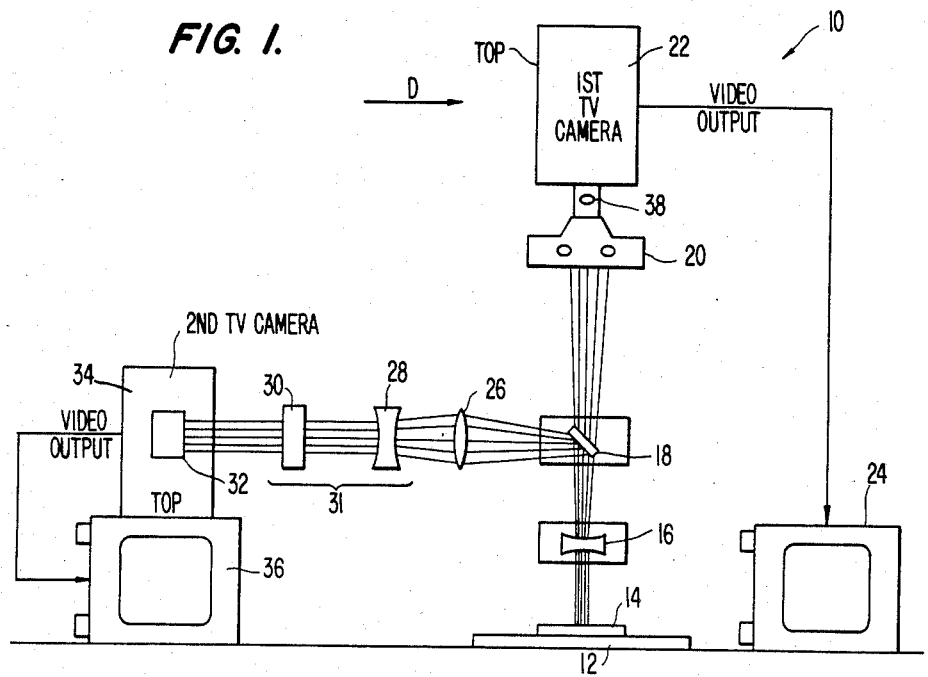
FIG. 1 is a front view of a first embodiment of the microscopic image display system of the present invention.
Figure 2:
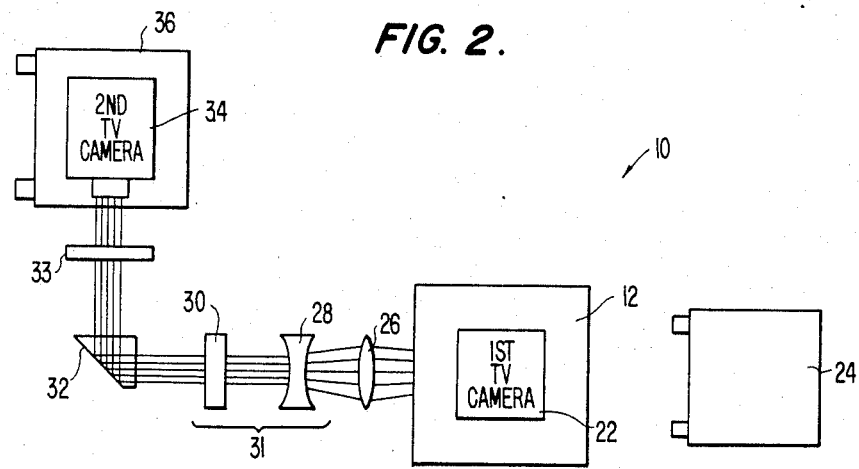
FIG. 2 is a top view of the first embodiment of the microscopic image display system of the present invention.

FIG. 1 is a front view of a first embodiment of the microscopic image display system of the present invention, while FIG. 2 is a top view of the first embodiment of the microscopic image display system. As seen therein, the system 10 comprises a stage 12, specimen slide 14, objective lens 16, splitter 18, trinocular microscope head 20, first camera 22, first TV monitor 24, field (converging) lens 26, diverging lens 28, reduction lens 30, bending prism 32, neutral density filter 33, second TV camera 34, and second TV monitor 36. Diverging lens 28 and reduction lens 30 form a demagnifying lens 31.

The objective 16 is preferably a 100X microscope objective having a high numerical aperture (1.3–1.4). Moreover, the optical output of the objective 16 must be characterized by a 15° divergence.

In accordance with a preferred embodiment of the invention, the amount of image provided as an optical output of the objective 16 covers an area of approximately 700 microns, but an image data area of only 350 microns is desired for display on the monitor 36; moreover, the image area of 350 microns preferably fills the entire display area of the monitor 36. This is accomplished by proper design choice of the following parameters: (1) the distance between the objective 16 and the field lens 26; (2) the distance between the field lens 26 and the lens 38 of camera 22; and (3) the reduction factor, that is, the ratio of the focal length of reduction lens 30 to the focal length of diverging lens 28.

Field lens 26 is preferably a 61 mm. double-convex converging lens measuring 16 ($\pm 5$) diopters. As is well-known, a diopter is the inverse of the focal length.

Diverging lens 28 is preferably a 102 mm. compound lens, such as a projection lens, which takes converging light (emanating from the field lens 26) and converts it to parallel light.

Reduction lens 30 is preferably a 28 mm. lens, such as is typically employed in a 35 mm. camera, for reducing the parallel light image coming from the diverging lens 28.

Bending prism 32 is any conventional light-bending prism employed for the purpose of bending light coming from reduction lens 30 so as to direct it toward camera 34. In this regard, it is to be noted that a first inversion of the image of the specimen takes place as a result of bending by the splitter 18, whereas a second inversion of the image takes place as a result of bending by the prism 32. It is to be further noted that the camera 34 is disposed in an inverted manner, with its top facing downward (in FIG. 1), whereas the monitor 36 is disposed on its side (as also shown in FIG. 1).

As a result of the latter arrangement, the image viewed on monitor 36 corresponds precisely, in orientation, to that viewed through the microscope directly (via the trinocular microscope head 20). Moreover, the arrangement is such that movement of the slide 14 (and its specimen) in a given direction will result in a movement of the image on monitor 36 in the corresponding direction on monitor 36. Finally, the placement of monitor 36 on its side results in vertical orientation of scan lines of the monitor, thus, facilitating viewing by the user.

Neutral density filter 33 (preferably, a Kodak Wratten No. 96) is disposed at some point in the optical path to the camera 34, preferably between prism 32 and camera 34 (FIG. 2), to compensate for an increase in light intensity occurring due to reduction in the second optical path.

Figure 3:
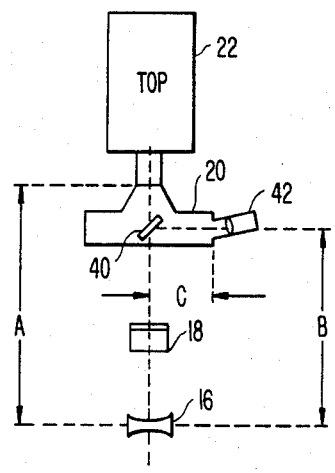
FIG. 3 is a side view of a portion of the microscopic image display system of FIG. 1, as viewed along the arrow D in FIG. 1.

FIG. 3 is a side view of a portion of the first embodiment of the present invention, as viewed along the line D in FIG. 1. As seen in FIG. 1, and as confirmed in FIG. 3, the camera 22 is preferably oriented with its top facing to the left in FIG. 1, while the monitor 24 is disposed on its side. As a result, the specimen as viewed through the trinocular microscope head 20 will correspond precisely in orientation to the view of the specimen displayed on the monitor 24 and viewing is facilitated. As best seen in FIG. 3, the trinocular microscope head 20 provides the user with the capability of viewing the fully magnified (100X) image of the specimen directly, that image being conveyed via the objective 16, splitter 18, further splitter 40 in the trinocular microscope head 20, and binocular viewing arrangement 42. The trinocular microscope head 20 is a conventional item available in the marketplace; for example, such a trinocular microscope head is manufactured by Olympus of Japan.

In order to provide the system with the aforementioned viewing capability, the present invention calls for the mounting of the trinocular microscope head 20, by suitable means, on the end of the camera 22 such that the distance B+C from the objective 16 to the binocular viewing arrangement 42 equals the distance A from the objective 16 to the camera 22 (specifically, the input lens 38 thereof).

Referring to FIGS. 1, 2 and 3, the operation of the system is as follows. The specimen to be viewed is placed on the slide 14, and the slide 14 is placed on the stage 12. The technician then adjusts the slide 14, using the trinocular microscope head 20 or the monitor 36 to view the specimen on slide 14. As mentioned previously, the arrangement is such that movement of the slide 14 in a given direction will result in precisely the same movement of the specimen on the monitor 36.

Once the specimen is properly positioned, the technician views the specimen under a lower magnification power (for example, 20X) on monitor 36 and under a higher magnification power (for example, 100X) on monitor 24. This simultaneous viewing of the specimen under lower and higher magnification powers is achieved without the need for switching of lenses and without any need for refocusing.

Figure 4:
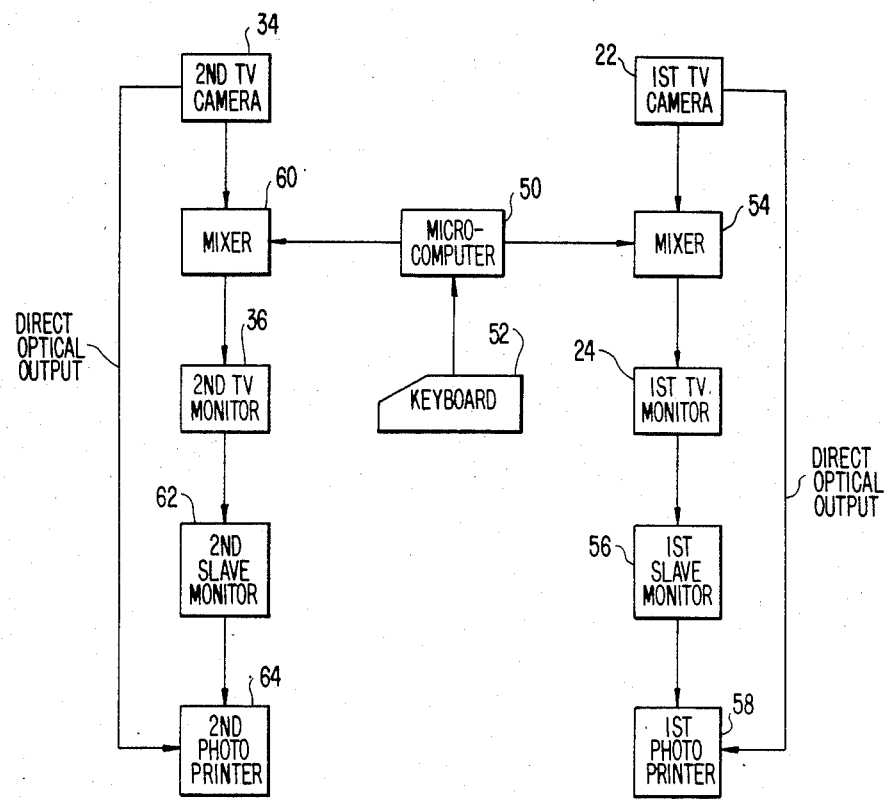
FIG. 4 is a block diagram further disclosing the microscopic image display system of the present invention.

FIG. 4 is a block diagram further disclosing the system of the present invention. As seen therein, the system comprises the previously discussed cameras 22 and 34 and monitors 24 and 36, and further comprises a microcomputer 50, keyboard (or other input means) 52, mixers 54 and 60, slave monitors 56 and 62, and photographic printers 58 and 64.

In operation, in the course of positioning a specimen on the slide 14 (FIG. 1), the technician uses the keyboard 52 to enter information relevant to the specimen into the microcomputer 50, the microcomputer 50 being appropriately programmed and configured to provide analog representations of the entered information to the mixers 54 and 60. As an example, the microcomputer 50 can be configured to include a Video Memory Board MFB-512-8-4-M and an A/D, D/A board MFB-512-8-1-M, manufactured by Imaging Technology, Inc. of Woburn, Mass., for the purpose of generating analog representations of information entered via keyboard 52.

The mixers 54 and 60 are conventional analog mixing devices, available in the marketplace, for mixing the analog video signals from the cameras 22 and 34, respectively, with the analog representations of operator-entered information provided by microcomputer 50, so as to generate a mixed video signal for provision to the monitors 24 and 36, respectively. As a result, monitors 24 and 36 display both the operator-entered information and the image of the specimen.

The system further provides the capability, via photographic printers 58 and 64, of producing a hardcopy record of the image displayed on the monitors 24 and 36, respectively. This can be accomplished in either one of two alternate ways: first, the cameras 22 and 34 can provide a direct optical output to the photographic printers 58 and 64, respectively; or second, slave monitors 56 and 62 can be connected to the output of monitors 24 and 36, respectively, so as to produce appropriate inputs to the photographic printers 58 and 64, respectively. The photographic printers 58 and 64 are, by way of example, implemented by an automatic print processor such as the "47th Street Photo Speed Printer" manufactured by the 47th Street Darkroom Center of New York, N.Y.

Figure 5A:
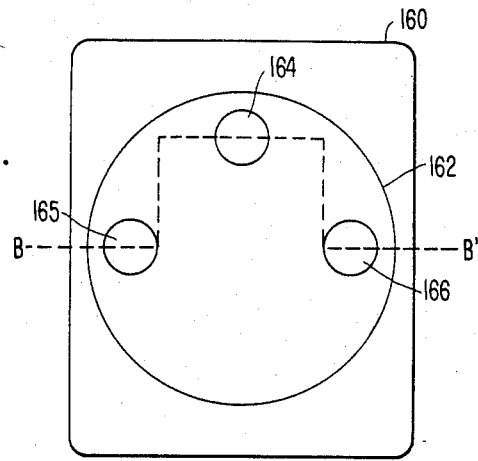
FIGS. 5A and 5B are a top view and a section view (along line B-B' of FIG. 5A), respectively, of a lens switching arrangement employed in accordance with the present invention.
Figure 5B:
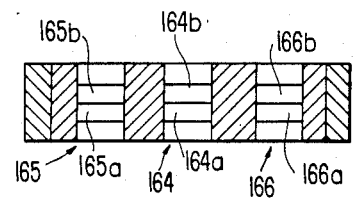

FIGS. 5A and 5B are top and sectional views, respectively, of a lens switching arrangement which can be employed with the system of the present invention. As seen in the figures, the lens switching arrangement comprises a frame member 160 in which a rotatable, circular disc-like member 162 is positioned, member 162 being rotatable within the member 160. The member 162 includes receptacles in which are disposed respective lens arrangements 164, 165 and 166.

More specifically, each of the lens arrangements 164, 165 and 166 has a different magnification power so that, by rotating the member 162 within the frame member 160, lens arrangements of different magnification powers can be moved into position in the optical path, thus providing variable magnification of the object being viewed.

In the prior art, it is well-known to provide a lens switching arrangement wherein lenses of differing magnification may be rotated into position in the optical path. However, a significant drawback to such prior art arrangements resides in the fact that, after rotating each lens into position, it is necessary to refocus the microscope with which the lens switching arrangement is being used.

In accordance with a feature of the present invention, there is no necessity to refocus the microscope when a new lens is switched into position in the optical path. This is due to the fact that, in accordance with the invention, and as seen in FIG. 5B, each lens arrangement 164, 165 and 166 includes a pair of lenses 164a and 164b, 165a and 165b, and 166a and 166b, respectively. More specifically, the present inventor has discovered that, by superimposing positive diopter lenses 164b, 165b and 166b on top of the negative diopter lenses 164a, 165a and 166a, respectively, and by arranging for a predetermined distance to be established between the negative diopter lens and its superimposed positive diopter lens, refocusing of the microscope after each switch to a new lens arrangement is unnecessary.

Accordingly, referring to FIGS. 1, 5A and 5B, in accordance with a further feature of the invention, a lens switching arrangement as shown in FIGS. 5A and 5B can be substituted for the objective lens 16 of FIG. 1. This will provide the microscopic image display system with the capability of switching objective lenses, thus providing the user with further flexibility in the establishment of split-image, multi-power displays.

Further embodiments of the invention will now be described with reference to various figures of the drawings. In the subsequently discussed figures of the drawings, elements identical to those previously discussed above are identified by reference numerials identical to those employed above.

Figure 6:
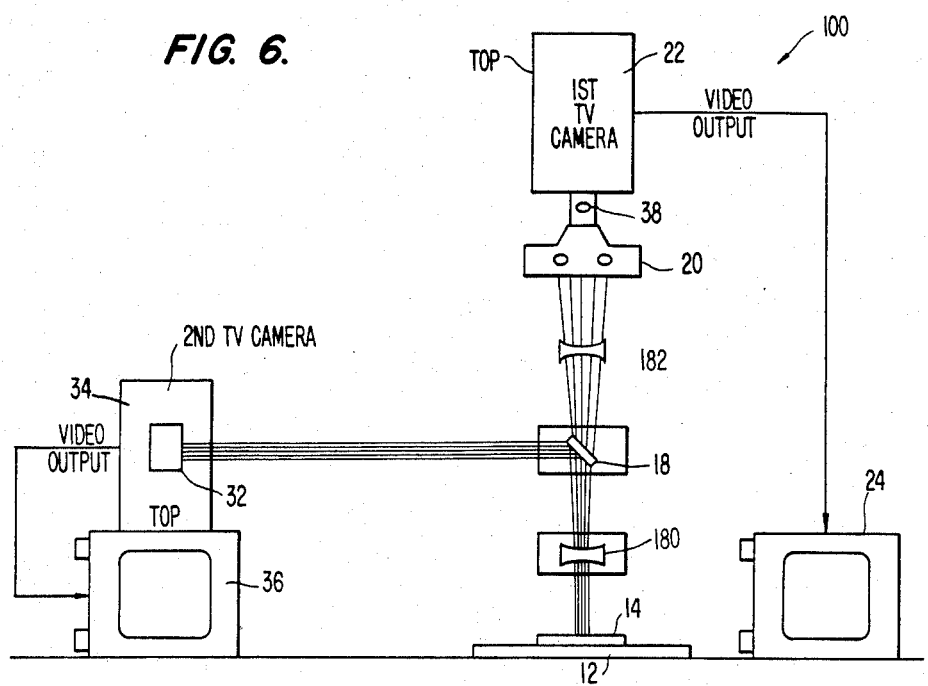
FIG. 6 is a front view of a second embodiment of the microscopic image display system of the present invention.
Figure 7:
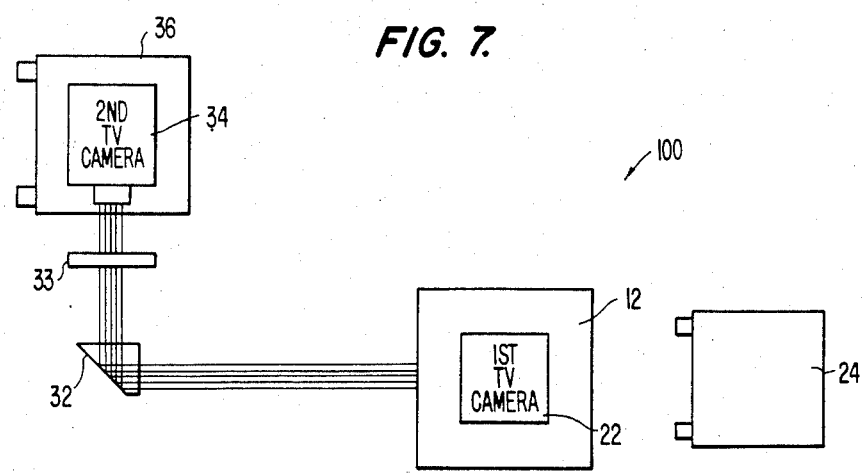
FIG. 7 is a top view of the second embodiment of the microscopic image display system of the present invention.

FIG. 6 is a front view of a second embodiment of the microscopic image display system of the present invention, while FIG. 7 is a top view of the second embodiment of the microscopic image display system. The difference between this second embodiment and the first embodiment already discussed resides in the fact that, in the second embodiment, a lower power objective 180 (preferably, a 20X objective or lithography lens) is employed between the specimen 14 and the splitter 18 to produce a relatively low power magnification of the specimen. This magnified image of the specimen is provided, via an optical path which is devoid of any optical elements, to bending prism 32 which directs the magnified image to TV camera 34. As a result, a relatively less magnified image of a larger portion of the specimen is displayed on TV monitor 36.

A further difference between the second embodiment and the first embodiment resides in the fact that, in the second embodiment, the magnified image from objective 180 is provided, via splitter 18, to a magnifying lens 182 (preferably, a 5X diverging lens) in another optical path, the lens 182 further magnifying the already magnified image and providing that further magnified image to the optical input of TV camera 22. As a result, a fully magnified image of a smaller portion of the specimen is displayed on TV monitor 24.

Figure 8:
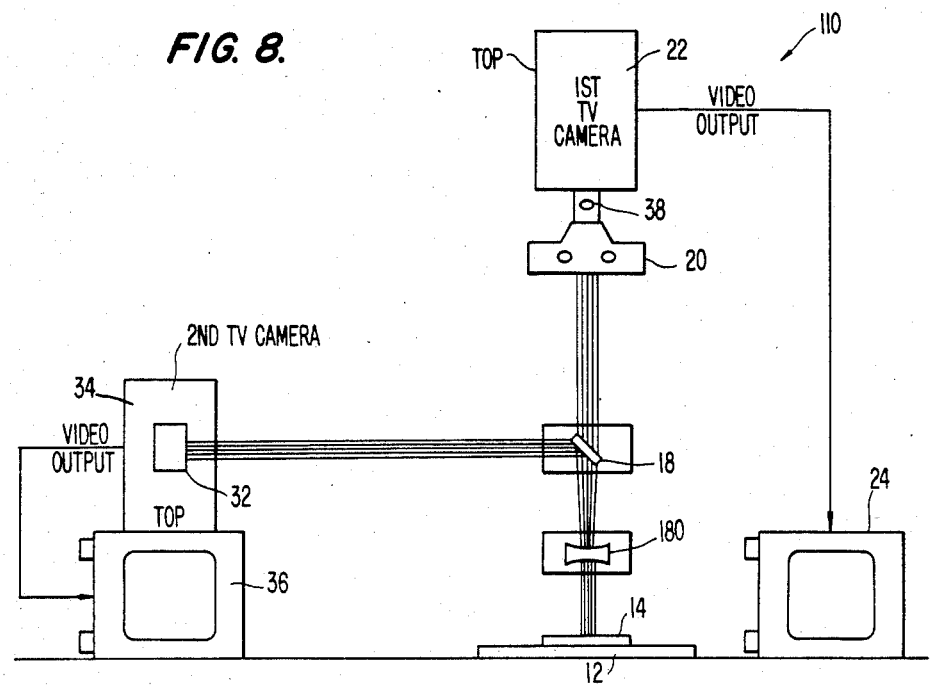
FIG. 8 is a front view of a third embodiment of the microscopic image display system of the present invention.
Figure 9:
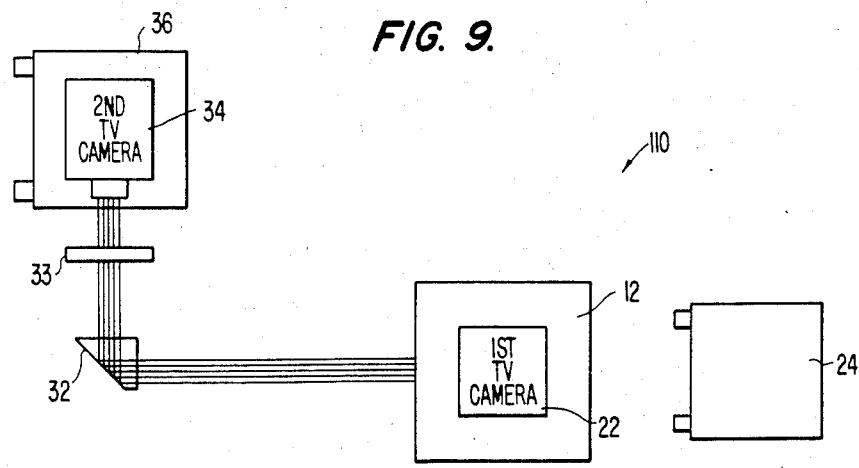
FIG. 9 is a top view of the third embodiment of the microscopic image display system of the present invention.

FIG. 8 is a front view of a third embodiment of the microscopic image display system of the present invention, while FIG. 9 is a top view of the third embodiment of the microscopic image display system. This embodiment of the invention is identical to the second embodiment, discussed above with reference to FIGS. 6 and 7, with one exception. In this embodiment of the invention, the magnifying lens 182 (FIGS. 6 and 7) of the second embodiment is dispensed with. In this embodiment, further magnification of the already magnified image emanating from objective 180 and splitter 18 is achieved by operating TV camera 22 in accordance with an "underscanning" technique.

Most specifically, in accordance with this third embodiment of the invention, the TV camera 22 underscans, preferably by a ratio of 5:1, the already magnified image emanating from objective 180 and provided via splitter 18. This results in a 5:1 magnification of the 20X-magnified image emanating from objective 180 and provided via splitter 18. As a result, a 100X-magnified image of the specimen 14 is displayed on TV monitor 24.

The "underscanning" technique employed in accordance with this embodiment of the invention is carried out by appropriately adjusting the horizontal scan voltage and vertical sweep voltage of the TV camera 22. More specifically, these voltages are adjusted so that the horizontal scan line has a length equal to approximately 0.4472 of its adjusted length, and so that the vertical sweep distance (distance between scan lines) has a value equal to approximately 0.4472 of its unadjusted value. In this manner, TV camera 22 will focus the same number of scan lines on a smaller area, that is, an area equal to one-fifth of its unadjusted value. Although underscanning does result in some loss in resolution, this is compensated by the 5:1 increase in image magnification achieved by underscanning.

Figure 10:
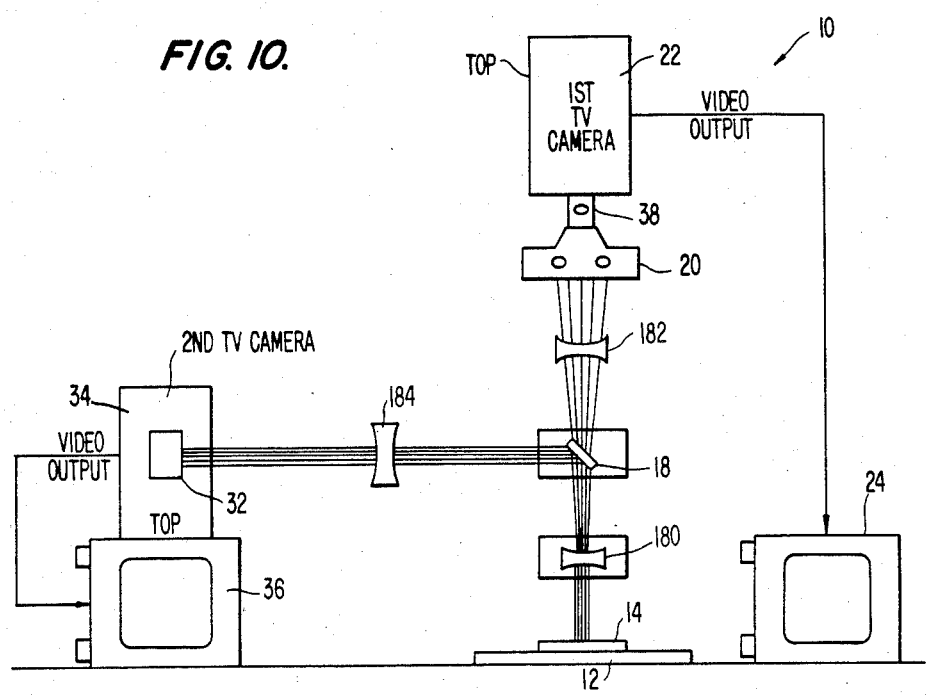
FIG. 10 is a front view of a fourth embodiment of the microscopic image display system of the present invention.
Figure 11:
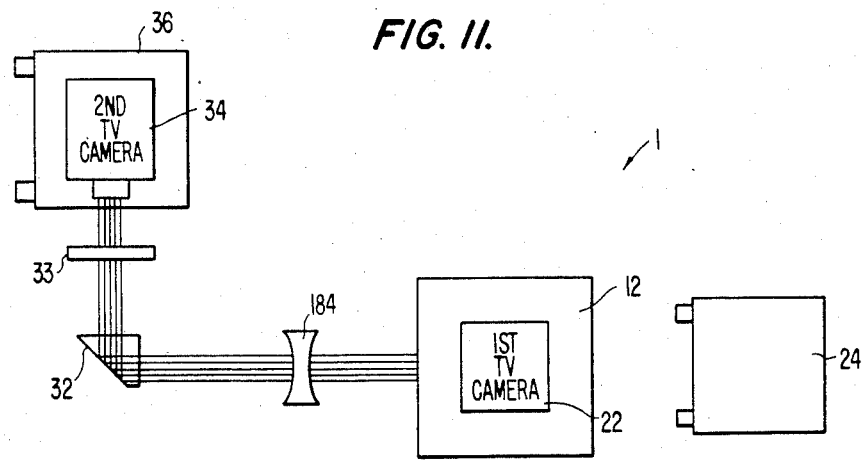
FIG. 11 is a top view of the fourth embodiment of the microscopic image display system of the present invention.

FIG. 10 is a front view of a fourth embodiment of the microscopic image display system of the present invention, while FIG. 11 is a top view of the fourth embodiment of the microscopic image display system. The difference between the fourth embodiment of the invention and the second embodiment of the invention, discussed above with reference to FIGS. 6 and 7, resides in the fact that this embodiment of the invention employs a magnifying lens or Barlow lens 184, the latter being disposed between the objective 180 and the image plane in the second optical path. That is to say, lens 184 is disposed at a point in the vicinity of the point at which lens 26 was disposed in the first embodiment (FIGS. 1 and 2). This results in a lengthening of the optical path and an increase in the focal length. Preferably, lens 184 has a magnification power of 2X or 3X, and thus further magnification of the already magnified image emanating from objective 180 results in production of an image having a magnification of between 40X and 60X. This somewhat further magnified image is displayed on TV monitor 36.

It is to be noted that, in each of the second, third and fourth embodiments discussed above, objective 180 is implemented either by a 20X objective (such as that manufactured by Olympus of Japan) or by a lithography lens having a large field (such as the lithography lens manufactured by Tropel Inc. of Rochester, N.Y.

It should also be noted that, since each optical element added to an optical path introduces some degree of degradation in that path, the first embodiment of the invention (that of FIGS. 1, 2 and 3) is most preferable since, in that embodiment, optical elements are introduced into the low-power path (the second path) wherein degradation does not have such a great impact on image quality. However, the second, third and fourth embodiments discussed above are also quite feasible and operable in view of the fact that the number of elements introduced into the high-power path (the first optical path) are kept to a bare minimum.

Finally, referring to FIGS. 1, 5A and 5B, as discussed in detail above, in accordance with a further feature of the invention, the lens switching arrangement shown in FIGS. 5A and 5B can be substituted for the objective lens 180 of FIGS. 6 thru 11. This will provide the microscopic image display system with the capability of switching objective lens without the need to refocus each time a new lens is switched into position, and will provide the user with further flexibility in the establishment of split-image, multi-power displays.

It is to be understood that the split-image, multi-power microscope image display systems and methods of the present invention must comply with the Koler technique (well-known in the art) in order to avoid focusing of the filament. In brief, every microscope has a filament which generates light which passes through the objective and is focused by one or more lenses in an objective plane. It is possible, in certain arrangements, to obtain a spurious image resulting from focusing of the filament. In order to avoid this problem, Koler developed lens arrangements and procedures so that the filament image was positioned quite a distance away, and thus was out of focus insofar as the microscopic viewer was concerned.

While preferred forms and arrangements have been shown in illustrating the invention, it is to be understood that various changes in detail and arrangement may be made without departing from the spirit and scope of this disclosure.

What is claimed is:

1. A method for displaying magnified images of an object having respective first and second magnifications, comprising:
    providing an objective, characterized by the first magnification, through which the image of the object passes to produce an objective optical output having the first magnification;
    splitting the objective optical output into the first and second optical outputs for passage through respective first and second optical paths;
    increasing the magnification of the first optical output in said first optical path to produce a third optical output characterized by the second magnification;
    providing the third optical output to a first camera which produces a first video output characterized by the second magnification;
    bending the second optical output to direct it toward a second camera which produces a second video output characterized by the first magnification; and
    processing said first and second video outputs to display first and second images, respectively, of the object magnified in accordance with the second and first magnifications, respectively.

2. The method of claim 1, wherein the bending step comprises passing the second optical output through a prism.

3. The method of claim 1, wherein the processing step comprises mixing at least one of said first and second video outputs with analog representations of operator-entered information so as to display the operator-entered information with the corresponding at least one of the first and second images of the object.

4. The method of claim 1, comprising the additional step of producing a hardcopy record of at least one of the first and second images of the object.

5. The method of claim 1, wherein the step of providing an objective comprises selecting one of a plurality of objectives, and wherein each objective comprises a negative-diopter lens with a superimposed positive-diopter lens.

6. The method of claim 1, wherein said objective is a lithography lens.

7. A system for displaying magnified images of an object having respective first and second magnifications, comprising:
    an objective lens, characterized by the first magnification, through which the image of the object passes to produce an objective optical output having the first magnification;
    splitting means for splitting the objective optical output into first and second optical outputs for passage through respective first and second optical paths;
    magnifying means disposed in said first optical path for increasing the magnification of the first optical output so as to produce a third optical output characterized by the second magnification;
    a first camera disposed in said first optical path and responsive to said third optical output for producing a first video output characterized by the second magnification;
    a second camera;
    bending means for bending the second optical output to direct it toward said second camera, said second camera producing a second video output characterized by the first magnification; and
    display means responsive to said first and second video outputs for displaying first and second images, respectively, of the object magnified in accordance with the second and first magnifications, respectively.

8. The system of claim 7, wherein the magnifying means comprises a diverging lens for diverging the first optical output to produce a diverged optical output comprising the third optical output.

9. The system of claim 7, wherein the bending means comprises a prism disposed at an end of the second optical path and adjacent to said second camera.

10. The system of claim 7, wherein said objective lens comprises a lithography lens.

11. The system of claim 7, further comprising mixing means connected to at least one of said first and second cameras for mixing at least one of said first and second video outputs with analog representations of operator-entered information so as to display the operator-entered information with the corresponding at least one of the first and second images of the object.

12. The system of claim 11, further comprising operator input means for inputting the operator-entered information, and processing means for processing the operator-entered information so as to provide the operator-entered information to said mixer means.

13. The system of claim 7, comprising photographic printer means operatively associated with said display means for producing a hardcopy record of at least one of the first and second images of the object.

14. The system of claim 7, comprising photographic printer means operatively associated with at least one of said first and second cameras for receiving a direct optical output therefrom, and for producing a hardcopy record of at least one of the first and second images of the object.

15. The system of claim 7, further comprising additional objective lenses and selecting means for selecting one of said objective lenses through which the image of the object passes.

16. The system of claim 15, wherein each objective lens comprises a negative-diopter lens and a superimposed positive-diopter lens.

17. A method for displaying magnified images of an object having respective first and second magnifications, comprising:
    providing an objective, characterized by the first magnification, through which the image of the object passes to produce an objective optical output having the first magnification;

splitting the objective optical output into first and second optical outputs for passage through respective first and second optical paths;

providing a first optical output via said first optical path to a first camera;

operating the first camera in a reduced-scanning mode so that said first camera effectively further magnifies the first optical output to produce a first video output characterized by the second magnification;

bending the second optical output to direct it toward a second camera which produces a second video output characterized by the first magnification; and processing said first and second video outputs to display first and second images, respectively, of the object magnified in accordance with the second and first magnifications, respectively.

18. The method of claim 17, wherein the bending step comprises passing the second optical output through a prism.

19. The method of claim 17, wherein the processing step comprises mixing at least one of said first and second video outputs with analog representations of operator-entered information so as to display the operator-entered information with the corresponding at least one of the first and second images of the object.

20. The method of claim 17, comprising the additional step of producing a hardcopy record of at least one of the first and second images of the object.

21. The method of claim 17, wherein the step of providing an objective comprises selecting one of a plurality of objectives, and wherein each objective comprises a negative-diopter lens with a superimposed positive-diopter lens.

22. The method of claim 17, wherein said objective comprises a lithography lens.

23. A system for displaying magnified images of an object having respective first and second magnifications, comprising:

an objective lens, characterized by the first magnification, through which the image of the object passes to produce an objective optical output having the first magnification;

splitting means for splitting the objective optical output into first and second optical outputs for passage through respective first and second optical paths;

a first camera disposed in said first optical path, said first camera being operated in a reduced-scanning mode so as to effectively further modify the first optical output and to produce a first video output characterized by the second magnification;

a second camera;

bending means for bending the second optical output to direct it toward said second camera, said second camera producing a second video output characterized by the first magnification; and display means responsive to said first and second video outputs for displaying first and second images, respectively, of the object magnified in accordance with the second and first magnifications, respectively.

24. The system of claim 23, wherein the bending means comprises a prism disposed at an end of the second optical path and adjacent to said second camera.

25. The system of claim 23, wherein said objective lens comprises a lithography lens.

26. The system of claim 23, further comprising mixing means connected to at least one of said first and second cameras for mixing at least one of said first and second video outputs with analog representations of operator-entered information so as to display the operator-entered information with the corresponding at least one of the first and second images of the object.

27. The system of claim 26, further comprising operator input means for inputting the operator-entered information, and processing means for processing the operator-entered information so as to provide the operator-entered information to said mixer means.

28. The system of claim 23, comprising photographic printer means operatively associated with said display means for producing a hardcopy record of at least one of the first and second images of the object.

29. The system of claim 23, comprising photographic printer means operatively associated with at least one of said first and second cameras for receiving a direct optical output therefrom, and for producing a hardcopy record of at least one of the first and second images of the object.

30. The system of claim 23, further comprising additional objective lenses and selecting means for selecting one of said objective lenses through which the image of the object passes.

31. The system of claim 30, wherein each objective lens comprises a negative-diopter lens and a superimposed positive-diopter lens.

32. A method for displaying magnified images of an object having respective first and second magnifications, comprising:

providing an objective, characterized by a given magnification less than said first and second magnifications, through which objective the image of the object passes to produce an objective optical output having the given magnification;

splitting the objective optical output into first and second optical outputs for passage through respective first and second optical paths;

increasing the magnification of the first optical output in said first optical path to produce a third optical output characterized by the first magnification;

increasing the magnification of the second optical output in said second optical path to produce a fourth optical output characterized by the second magnification;

providing the third optical output to a first camera which produces a first video output characterized by the first magnification;

bending the fourth optical output to direct it toward a second camera which produces a second video output characterized by the second magnification; and processing said first and second video outputs to display first and second images, respectively, of the object magnified in accordance with the first and second magnifications, respectively.

33. The method of claim 32, wherein the step of increasing the magnification of the second optical output comprises passing the second optical output through a Barlow lens.

34. The method of claim 32, wherein the bending step comprises passing the fourth optical output through a prism.

35. The method of claim 32, wherein the objective comprises a lithography lens.

36. The method of claim 32, wherein the processing step comprises mixing at least one of said first and second video outputs with analog representations of operator-entered information so as to display the operator-entered information with the corresponding at least one of the first and second images of the object.

37. The method of claim 32, comprising the additional step of producing a hardcopy record of at least one of the first and second images of the object.

38. The method of claim 32, wherein the step of providing an objective comprises selecting one of a plurality of objectives, and wherein each objective comprises a negative-diopter lens with a superimposed positive-diopter lens.

39. A system for displaying magnified images of an object having respective first and second magnifications, comprising:

an objective lens, characterized by a given magnification less than the first and second magnifications, through which objective lens the image of the object passes to produce an objective optical output having the given magnification;

splitting means for splitting the objective optical output into first and second optical outputs for passage through respective first and second optical paths;

first magnifying means disposed in said first optical path for magnifying the first optical output to provide a third optical output characterized by the first magnification;

second magnifying means disposed in said second optical path for magnifying the second optical output to provide a fourth optical output characterized by the second magnification;

a first camera disposed in said first optical path and responsive to said third optical output for producing a first video output characterized by the first magnification;

a second camera;

bending means for bending the fourth optical output to direct it toward said second camera, said second camera producing a second video output characterized by the second magnification; and display means responsive to said first and second video outputs for displaying first and second images, respectively, of the object magnified in accordance with the first and second magnifications, respectively.

40. The system of claim 39, wherein the first magnifying means comprises a diverging lens for diverging the first optical output to produce a diverged optical output comprising the third optical output.

41. The system of claim 39, wherein said second magnifying means comprises a Barlow lens.

42. The system of claim 39, wherein said objective lens comprises a lithography lens.

43. The system of claim 39, wherein the bending means comprises a prism disposed at an end of the second optical path and adjacent to said second camera.

44. The system of claim 39, further comprising mixing means connected to at least one of said first and second cameras for mixing at least one of said first and second video outputs with analog representations of operator-entered information so as to display the operator-entered information with the corresponding at least one of the first and second images of the object.

45. The system of claim 44, further comprising operator input means for inputting the operator-entered information, and processing means for processing the operator-entered information so as to provide the operator-entered information to said mixer means.

46. The system of claim 39, comprising photographic printer means operatively associated with said display means for producing a hardcopy record of at least one of the first and second images of the object.

47. The system of claim 39, comprising photographic printer means operatively associated with at least one of said first and second cameras for receiving a direct optical output therefrom, and for producing a hardcopy record of at least one of the first and second images of the object.

48. The system of claim 39, further comprising additional objective lenses and selecting means for selecting one of said objective lenses through which the image of the object passes.

49. The system of claim 48, wherein each objective lens comprises a negative-diopter lens and a superimposed positive-diopter lens.

* * * * *

UNITED STATES PATENT AND TRADEMARK OFFICE
CERTIFICATE OF CORRECTION

PATENT NO. : 4,651,200
DATED : March 17, 1987
INVENTOR(S) : Robert S. Ledley

It is certified that error appears in the above—identified patent and that said Letters Patent is hereby corrected as shown below:

Column 9, line 26, after "into" delete "the".

Column 11, line 4, "a" should read "the".

Signed and Sealed this

Eighteenth Day of August, 1987

*Attest:*

DONALD J. QUIGG

*Attesting Officer*  *Commissioner of Patents and Trademarks*